(12) United States Patent
Todd (10) Patent No.: US 6,433,776 B1
(45) Date of Patent: Aug. 13, 2002

(54) VARIABLE RATE VALUE SELECTOR

(75) Inventor: Stephen James Paul Todd, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/296,751

(22) Filed: Apr. 23, 1999

(30) Foreign Application Priority Data

Oct. 27, 1998 (GB) .............................................. 9823381

(51) Int. Cl.$^7$ .................................................. G09G 5/08

(52) U.S. Cl. ...................................... 345/157; 345/840

(58) Field of Search ................................. 345/165, 156, 345/157, 159, 160, 163, 764, 781, 840, 788

(56) References Cited

U.S. PATENT DOCUMENTS

| | | | | |
|---|---|---|---|---|
| 5,508,717 A | * | 4/1996 | Miller | 345/145 |
| 5,877,748 A | * | 3/1999 | Redlich | 345/163 |
| 6,052,115 A | * | 4/2000 | Gregg et al. | 345/159 |
| 6,219,027 B1 | * | 4/2001 | Shimizu et al. | 345/145 |

FOREIGN PATENT DOCUMENTS

GB     2 307 383     5/1997

* cited by examiner

*Primary Examiner*—Cao H. Nguyen
(74) *Attorney, Agent, or Firm*—McGinn & Gibb, PLLC; Louis J. Percello, Esq.

(57) ABSTRACT

A value selector component for a graphical user interface control comprising: means for reading successive pointer movements when said user interface control is in focus; and means responsive to pointer movement in one direction to control a value and responsive to pointer movement in another direction to control a rate of change of the value in response to the movement in the one direction.

21 Claims, 6 Drawing Sheets

VARIABLE RATE VALUE SELECTOR

FIELD OF THE INVENTION

The present invention relates to a value selector component for a graphic user interface.

BACKGROUND OF THE INVENTION

Users of computer applications often wish to set a value interactively. Standard techniques include direct text input from the keyboard, and the use of spin and slider controls. These techniques typically use discrete input events such as keystrokes and mouse clicks, or continuous input events such as mouse movement. Some use a combination of the two: a slider is typically controlled by continuous mouse movement, but may also be controlled by mouse clicks on certain regions of the control, or by key strokes such as cursor keys or Page-Up. Some techniques use two dimensions of mouse movement, for example a colour picker may change hue as the mouse moves round a colour circle and saturation as the mouse moves to and from the centre of the circle. Other techniques use advanced input devices with many degrees of freedom.

Many applications are much more intuitive to use with continuous input than with discrete input. However, it is difficult to use continuous input to control a value with a wide range of values to a high precision. This invention provides an easy to use solution to that problem.

SUMMARY OF THE INVENTION

Accordingly, the present invention provides a value selector component for a graphic user interface control comprising: means for reading successive pointer movements when said user interface control is in focus; and means responsive to pointer movement in one direction to control a value and responsive to pointer movement in another direction to control a rate of change of the value in response to the movement in the one direction The basic concept of the invention is to use two dimensions of mouse (or other pointer) movement to control a single value. Mouse movement in one dimension (e.g. left/right) controls the value as with a slider. Mouse movement in another direction (e.g. up/down) controls the sensitivity of the value movement ie. the rate of change of the value in response to the movement in the one direction.

For convenience in the rest of this description, we assume that horizontal movement controls the value and vertical movement controls the sensitivity. The invention also operates with vertical for value and horizontal for rate, or even with other skewed axes. Similarly, the description is in terms of mouse movements, even though the invention works with any two dimensional pointer device such as a pen or a touch screen. Finally, we call the invention and the screen area used to initiate interaction with it a control, even though there are many implementations of which an ActiveX control is just one. The control is described assuming conventional Windows™ interaction techniques. The interaction is initiated when the control is selected and the mouse button depressed; interaction terminates when the mouse button is released. Other initiation and termination techniques could be used for other environments.

BRIEF DESCRIPTION OF THE DRAWINGS

Embodiments of the invention will now be described with reference to the accompanying drawings, in which:

FIGS. 5 through 8C show tracks of mouse movement with associated value and sensitivity settings for controls according to embodiments of the invention, each cursor position in the track being marked with a current value and stroke range.

DESCRIPTION OF THE PREFERRED EMBODIMENTS

The invention can be described generally by way of example. Take a control located in the centre of a screen (not shown), with an initial value of 500. With the invention, selecting the object by pressing the mouse button, and keeping the mouse button down while moving the mouse from centre left to centre right of the screen changes the value from 450 to 550, a 'full stroke' range of 100. If the control is selected and the mouse moved to centre top of the screen, value sensitivity increases 100 fold to a stroke range of 10,000. Movement from left to right of the screen changes the value from –4,500 to 5,500, but with low precision. Conversely, if the control is selected and the mouse moved to the centre bottom of the screen, value sensitivity decreases 100 fold to a stroke range of 1. Movement from left to right only changes the value from 499.5 to 500.5, but with high precision.

Figure 5:
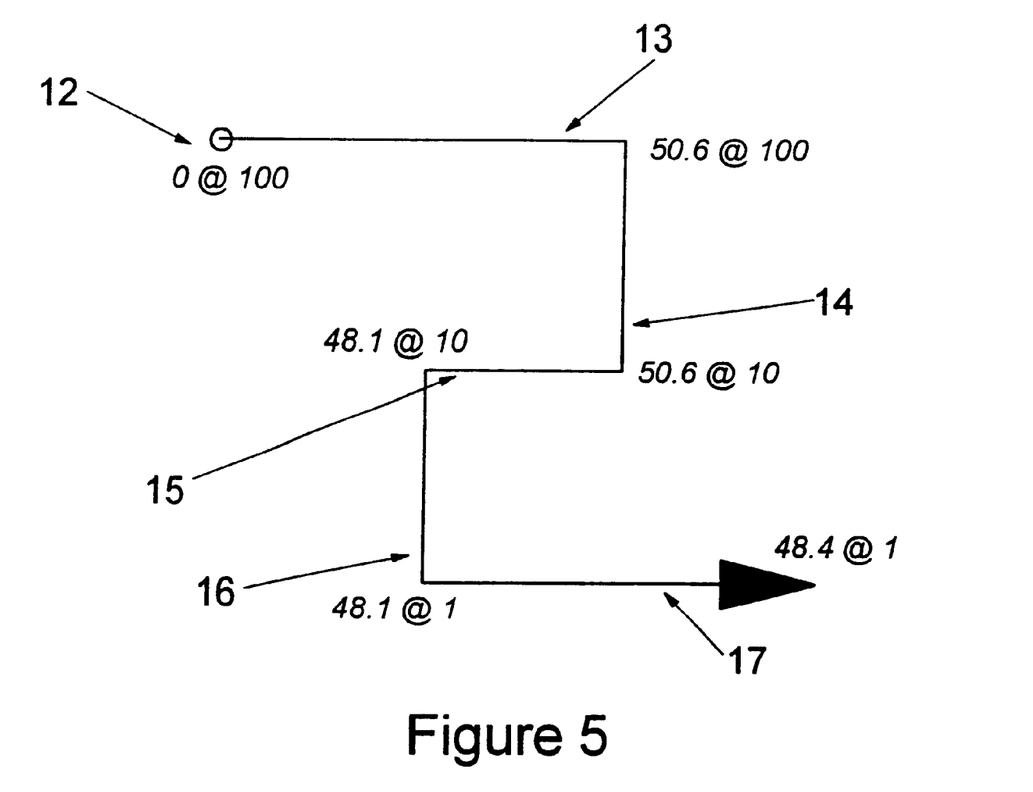

Thus the invention is most applicable where a set of value changes at ever increasing precision is required. FIG. 5 shows a typical use of the invention, with the user gradually homing in on a required value of 48.4, increasing precision during the process. The cursor starts at an initial position on the screen (12), with a value of 0 and a stroke range of 100. A right mouse movement (13) sets the value to 50.6, without altering the stroke range. This is a slight overshoot, so the user moves the mouse down (movement (14)) to set the finer stroke range of 10. A left stroke (15) reduces the value to 48.1; again a slight overshoot. A final movement down (16) sets a stroke rate of just 1, so the final right fairly large movement (17) is able to set the required value of 48.4 quite precisely.

The above explanation was in terms of setting a specific numeric value for a control. However, the user may not directly concerned with this numeric value, but may be concerned with the effect of the controlled value on an application. For example, the controller value may be used to set the left co-ordinate of a box. Changing the value moves the box from left to right. The user does not care about the numeric value of the control, only about the position of the box. Initially, left right movement of the cursor makes the box exactly track the cursor. Moving the cursor down increases the precision, so a broad cursor sweep moves the box only a small distance. Precise cursor box tracking is lost, but high precision placement of the box becomes easy.

In the above description, all the left right movements are treated as relative movements, even where an absolute pointing device is used. There is no absolute mapping of any mouse position on the screen to a controlled value. For example, consider the following moves of the mouse. (1) Start at the centre (value=0, stroke range=100). (2) Move up to the top centre (strokeRange=10000). (3) Move half right to the top right (value=value+5000=5000). (4) Move down to centre right (strokeRange=100). (5) Move half left to the centre (value=value–50=4950). The mouse begins and ends at the same position, but the value changes.

Figure 1:
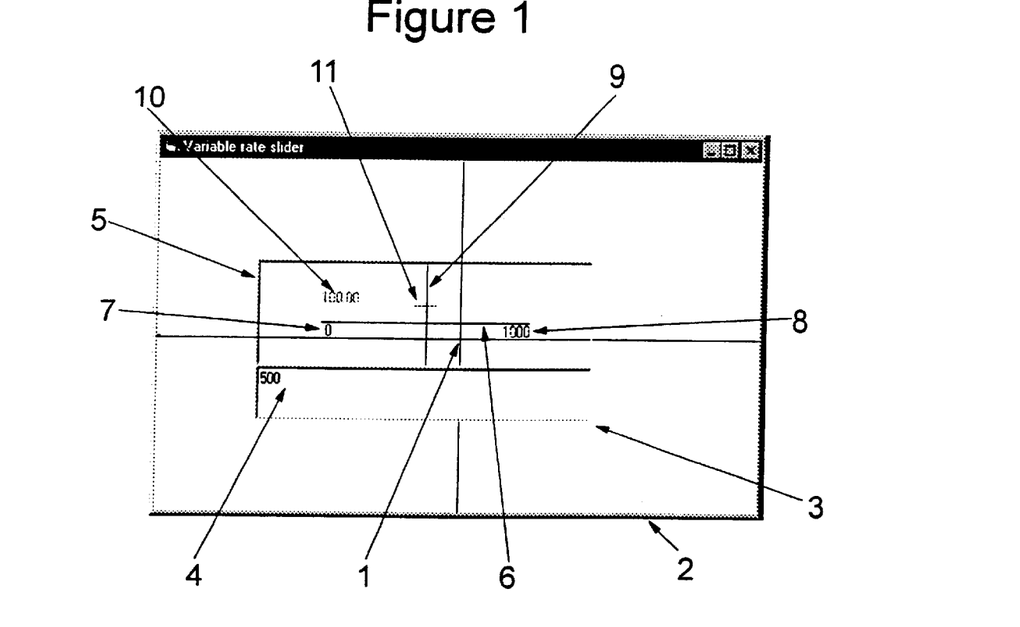
FIGS. 1 through 4 show screen shots of a control that implements the invention.

Turning now to FIG. 1 which shows a cross-hair cursor (1) having selected a value selector control (3) placed in the middle of an application window (2). For diagrammatic convenience FIGS. 1 to 4 show just the application window (2) and not the entire screen, and a full stroke is taken as the size of the application window (2) rather than the size of the screen. The control (3) is much larger than would be typically used, and there are no other controls in the application.

An initial value "500", is shown in a text feedback (4) part of the control (3). A graphical feedback part (5) of the control (3) shows the full range of possible values as a range bar (6), with the minimum value "0" shown as minimum value text (7), and a maximum value "1000" shown as maximum value text (8). The value is also shown graphically by a vertical line (9) across the range bar. The current range of values available by a full horizontal stroke of the mouse across the screen "100" is shown as stroke range text (10). This is also shown graphically by a stroke range bar (11). As the cursor (1) is roughly in the centre of the application window (2), the value indicator (9) is roughly in the centre of the stroke range bar (11).

Figure 2:
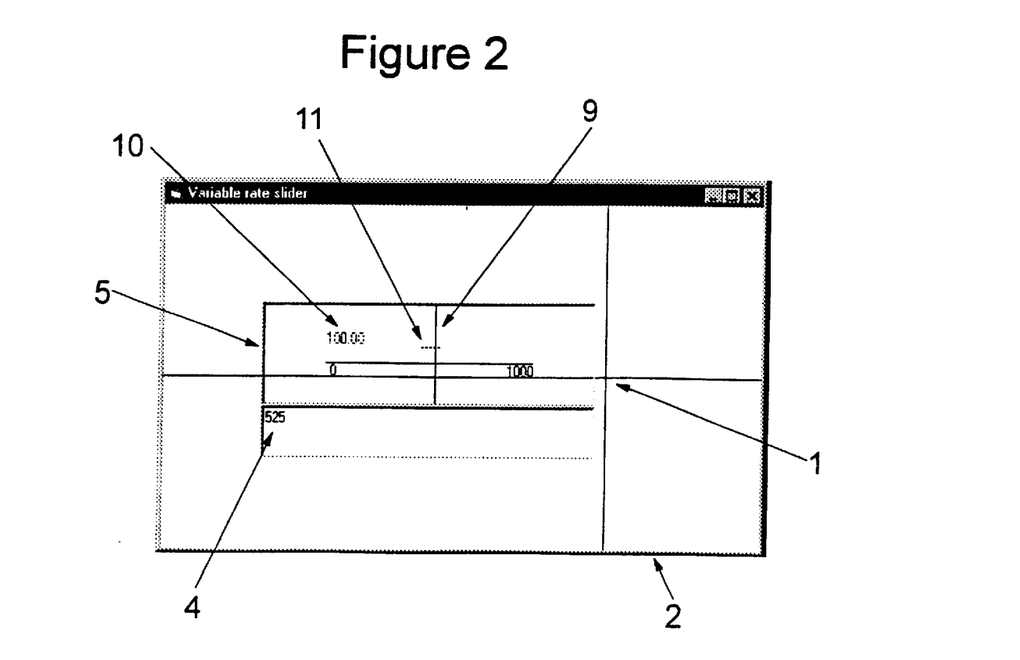

FIG. 2 shows the cursor (1) moved halfway to the right of the application window (2). The mouse has moved a quarter of the width of the screen and the full stroke value shown at (10) is "100", so the value has changed by 25 and is now 525. This is shown textually at (4), and graphically at (9). Notice that the value display (9) is now roughly three quarters across the stroke range bar (11).

Figure 3:
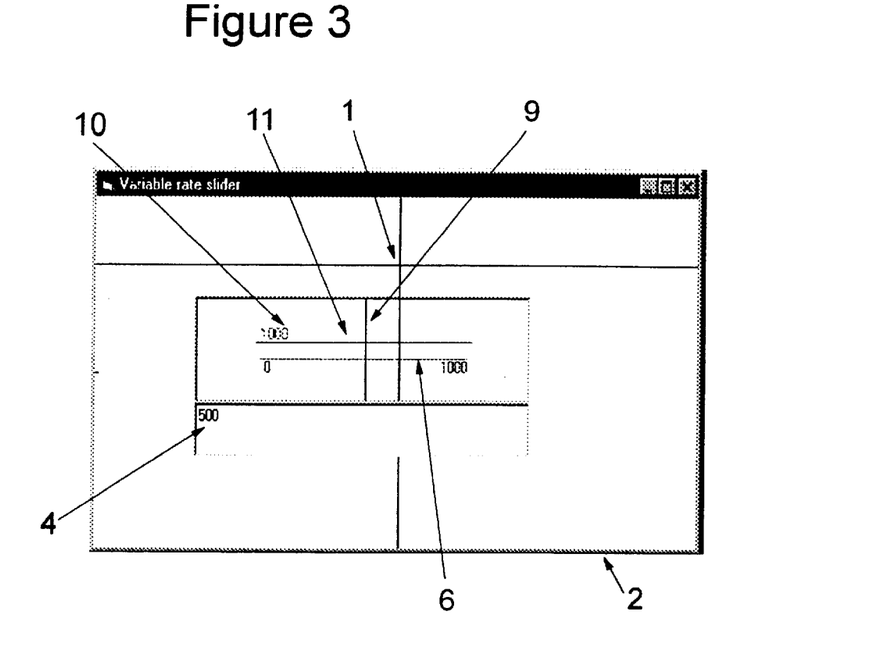
Figure 4:
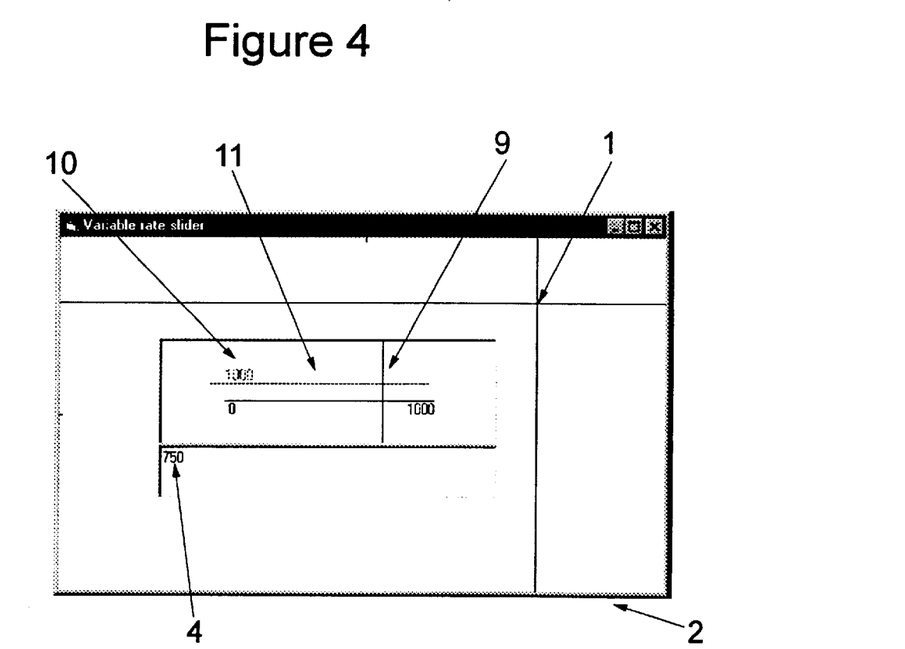

In FIG. 3, the cursor (1) has been moved from the central position of FIG. 1 to half way up the centre of the window. This has increased the stroke range from 100 to 1000, displayed as stroke range text (10). The growth in the stroke range bar (11) to approximately align with the value range bar (6) shows that the entire value range is now accessible by moving the mouse across the application window (2). The pure vertical movement of the cursor has not changed the value from its initial "500", shown textually (4) and graphically (9). In FIG. 4, the cursor (1) has been moved half way to the right. This quarter screen movement with a stroke range of 1,000 has changed the value by 250 to 750. This is displayed in the value text (4), and the value graphic (9).

There are several further refinements and advantages to the basic technique appropriate for particular applications.

Pure Vertical and Horizontal Movements

It will be seen that users cannot easily move a mouse precisely horizontally or vertically. Where a movement is close to an axis, movements in the other direction may be ignored. This is particularly important where a user is close to a required value and wishes to set it more precisely. The user moves the cursor down to increase precision. However, the start of the down movement may involve a significant involuntary left movement. The sensitivity is still fairly high at the start of the down movement, so the small left movement causes significant upset the controlled value. In a preferred embodiment, the horizontal change can be ignored by treating near vertical movement as a pure vertical movement to resolve this problem.

Also it will be seen that it may be difficult to consider the simultaneous effect of a value change and a rate change. One option is to consider all movements within 45 degrees of horizontal as pure horizontal movements, and all movements within 45 degrees of vertical as pure vertical movements.

Furthermore, movements within, say 20 degrees, of each axis can be considered as pure movements along the axis. Other movements, such as a 45 degree movement, fall into a 'dead zone' and are ignored completely.

Figure 6:
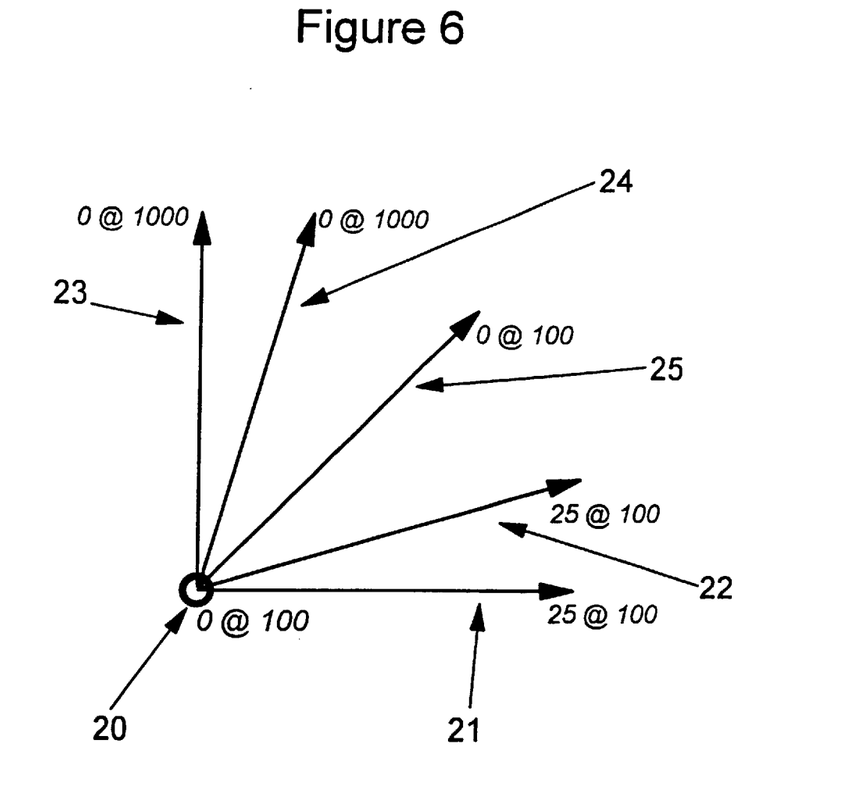

FIG. 6 shows the effect of various individual cursor movements where a dead zone is used. In each case the cursor starts at (20), with a value of 0 and a stroke range of 100. The first stroke (21) is a horizontal stroke. It takes the value to 25 and does not effect the stroke range. The second stroke (22) is almost horizontal. The stroke is treated as a pure horizontal stroke. The small change that might have been expected to the stroke range is ignored. The third stroke (23) is pure vertical, taking the stroke range to 1000 but not effecting the value. The fourth stroke (24) is almost vertical, and treated as pure vevertical, identical to stroke (23). The fifth stroke is at approximately 45 degrees and falls into the dead zone. Neither the value nor the rate are effected by this stroke.

Clutch Effect

A user can take advantage of the dead zone to provide a clutch effect. A clutch implementation imposes fairly tight requirements on pure horizontal and vertical movements, with a wide dead zone used as a clutch. For example, a single stroke consists of mouse right, mouse left/down at 45 degrees, mouse left/up at 45 degrees. This sequence is easily learned as a gesture. A similar sequence can be used for large vertical movements. The gesture clutch is useful on a pen based device such as a Palm Pilot. These often have only one pointer button (pen down), and no keyboard.

Figure 7:
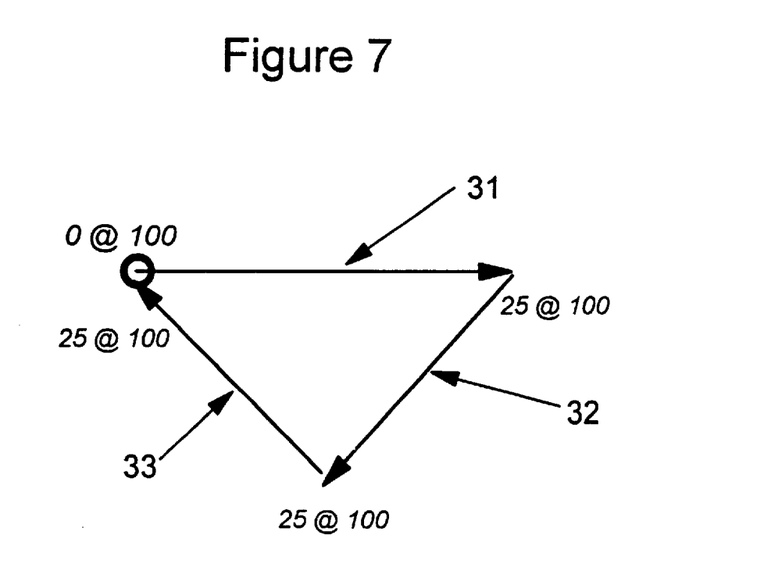

FIG. 7 shows the use of a gesture clutch. Vertical movement (31) takes the value from 0 to 25 and does not effect the stroke range. Both the subsequent movements (32) and (33) are in dead zones, and so effect neither the value nor the stroke range. The overall effect is that the mouse has returned to its original position, but the value has changed from 0 to 25.

Discretisation

In many cases it may be useful to have an effectively continuously controlled value. In other cases these is a significance in particular discrete values; maybe for an inherent application reason or just for clarity of display. The discretisation level of the value may be changed automatically according to the sensitivity. Thus while a value is being changed in the range 0 to 10,000, it may well not be significant that the value is 8,456.446 rather than 8,500. However, when the user has homed in on a range 8,456.41 to 8,457.51, the last two decimal places may be extremely important.

For display of numeric values it is convenient to make the discretisation level a power of ten approximately 1/100th of the stroke range. Thus stroke ranges of 20,000, 10,000 and 5,687 all give a discretisation level of 100. A stroke range of 100 gives a discretisation level of 1. A stroke range of 1 gives a discretisation level of 0.01.

As discretisation becomes coarser, detail at the less significant end of the value may be lost. For example, if a value is set to 2513 and the user moves to a discretisation level of 10s, mouse movement sets subsequent values to 2520 and 2530.

It is also possible to change the sensitivity in discrete steps. As the precise value of sensitivity is not critical, this is not generally useful.

It should be noted that smooth implementation of discrete values would normally require internal maintenance of a continuous version of the value, or some other method to keep track of cumulative incremental changes.

Figure 8A:
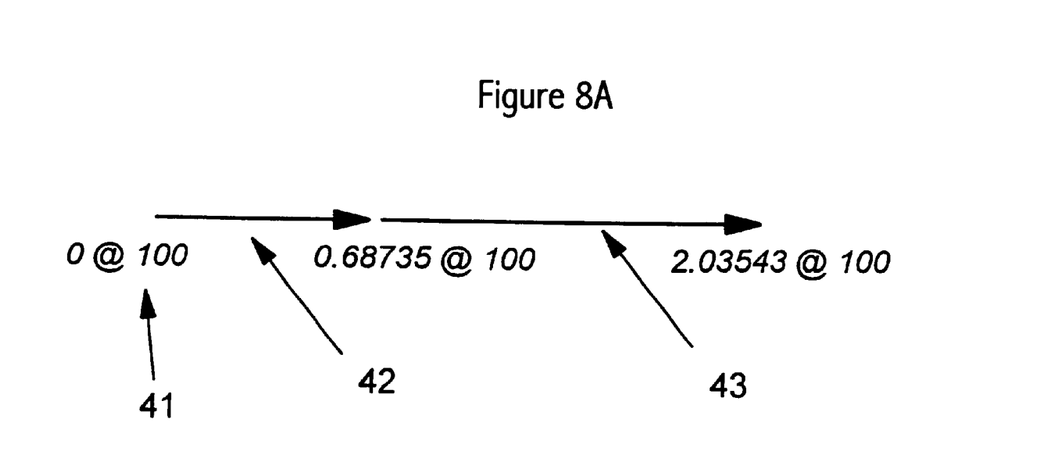
Figure 8B:
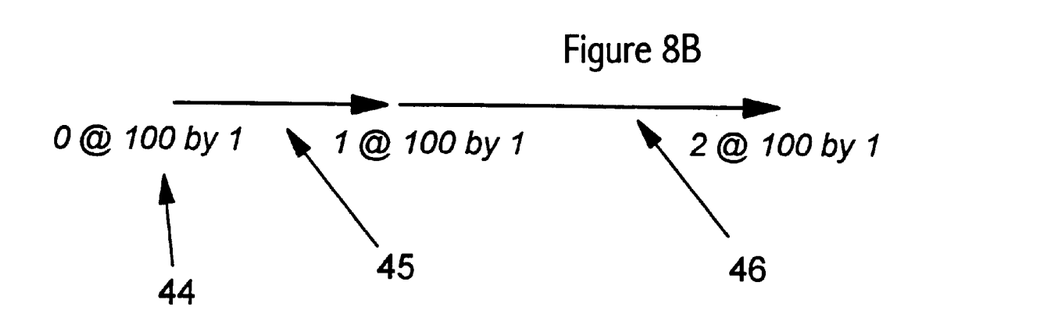
Figure 8C:
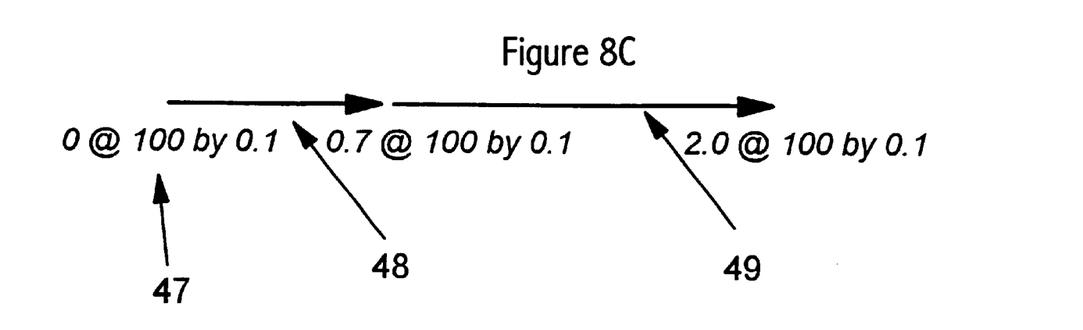

FIGS. 8A–8C show the effect of discretisation where the same pair of mouse movements (three mouse positions) are shown in each of three cases. In each case the value starts at 0, and the stroke range remains a constant 100. In the first case, discretisation is not used. The first shorter movement (42) takes the value to 0.68735, and the second longer movement (43) takes it to 2.03543. In the second case, a discretisation level of 1 is being used, as indicated in the "by" clause of the stroke range text (44). The first movement (45) now takes the value to 1, and the second movement (46) takes the value to 2. With discretisation of 0.1, the first movement (48) takes the value to 0.7, the second (49) to 2.0. Discretisation level is preferably automatically connected to the stroke range, so that a range of 100 is associated with a discretisation level of 1, and a range of 10 with a discretisation level of 0.1. This automatic change of the discretisation level is not illustrated here.

Full Stroke and Screen Real Estate

Once a control has been selected, probably with a mouse down action, it remains in focus and mouse movements are reported back to it as long as the mouse button remains down, even when the mouse is moved outside the control itself. This permits a very small control to use the full range of the application window, or even the full range of the screen. The size of the control depends only on the amount of feedback that is to be given to the user, and not on the range or precision of the value to be controlled.

Initial Sensitivity and Other Properties

The purpose of this invention is to provide a convenient method for the end user to control sensitivity. There are several other aspects that must also be controlled. These include the initial sensitivity (the example above assumed a stroke range of 100), the overall valid range (the example above did not assume any restriction), and the degree of sensitivity change for a full stroke vertical movement (the example above assumed a stroke range of 10,000). A programmer would usually set these on behalf of the end user. Where the technique is packaged as a Java bean or an ActiveX control these values will be exposed as properties to be set by the application programmer deploying the control. Sensitivity may be defined in various units. It is convenient for the application programmer to define it in terms of the overall change of value for a full stroke.

Sensitivity preferably changes exponentially with changes of mouse movement. Other mappings of movement to sensitivity could be used.

Resetting Sensitivity

The sensitivity may also be used as a relative and not an absolute value. In this case it is convenient to provide the end user with a method to reset the sensitivity to the initial value set by the application programmer. The sensitivity may be reset each time the control is reselected, or by some special action such as a mouse double click.

Undo

A new value is saved on an undo stack each time the user makes a pure vertical movement. This provides a good compromise. Too frequent saving makes undo very awkward; too infrequent saving may not save an undo value the user wants. For example, suppose the user is at a barely adequate value (V1), and needs to change it quite significantly. The user moves the mouse up to increase sensitivity; this automatically saves V1 as an 'undo' value. An over enthusiastic up movements makes control too sensitive. A movement to the right increases the value, but much too much. Hitting the undo key (probably Escape or control-Z) resets the value to V1.

Special Data Types

Where the value being controlled represents a special data type, the discretisation levels may be set accordingly. For example, an imperial weight could use discretisation levels of tons, hundredweight, stones, pounds, ounces and so on. Date time values could use levels of century, decade, year, month, day, hour, ten minute, minute, ten second and second (and so on down if necessary). In some application day of week would also be used.

In some cases it is appropriate to use discretisation for changes, rather than for absolute values. For example, a date time in a diary application has been set to 98/10/09_ 11:00:00. The user is changing this and has moved the mouse up so that the discretisation level is days. The value advances to keep the time of 11:00 through 98/10/10_ 11:00:00 to 98/10/11_11:00:00. It does not break on the day boundary and set the time to midnight and thus advance through 98/10/10_00:00:00 to 98/10/11_00:00:00.

Feedback

Figure 9A:
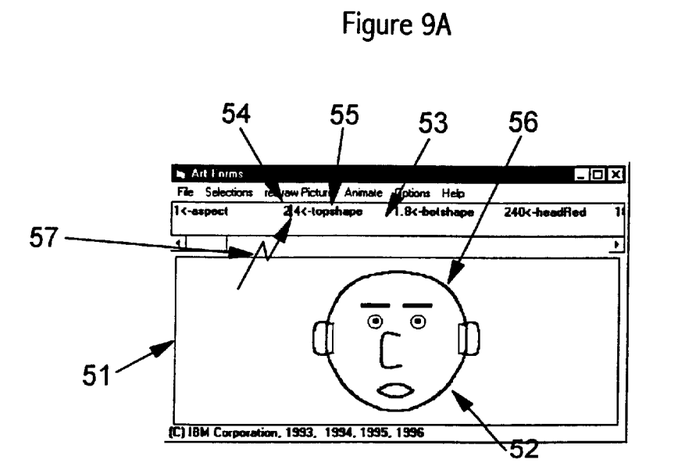
FIGS. 9A–9C show the invention in operation within an application.
Figure 9B:
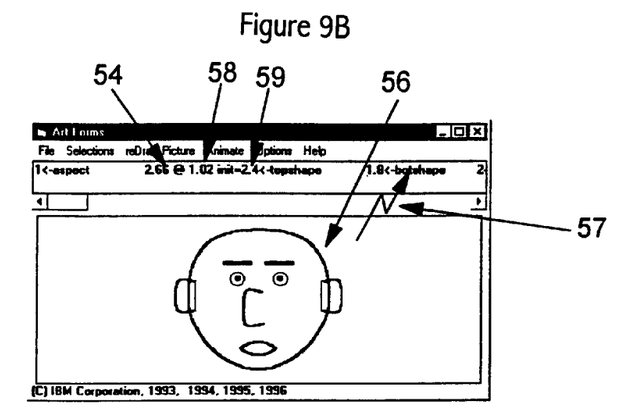
Figure 9C:
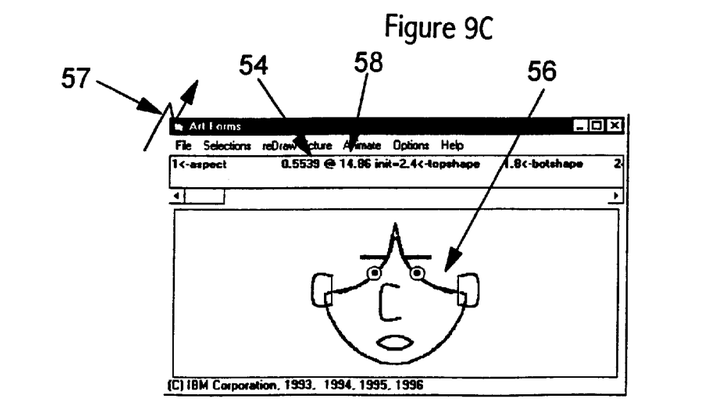

It is necessary for the user to have feedback of the interaction. This will often be provided by the application based on the control, and this is generally the most valuable form of feedback, as shown in FIG. 9. Sometimes it is necessary for the control to provide feedback itself, as shown in FIGS. 1 through 4. This may be done by a text value (4), or by a graphical display (9). Graphical display is likely only to give a very course guide when used with this invention, as it suffers from the same difficulty with simultaneous expression of wide range and high accuracy that is encountered by a one dimensional input device.

It may also be important to feedback a sensitivity indication. The user can judge the current value by observing the effect on the application, but can only use the application to judge sensitivity by making a trial interaction. Sensitivity is conveniently fed back by a display of the stroke range. Again, this can be fed back as a text value (10) or graphically (11). Graphical feedback is more appropriate here, as the exact value of sensitivity is not itself sensitive. Text feedback can also be used for discretisation, FIG. 8. The stroke range and discretisation are conveniently combined in a single string; for example "1000 by 10", or "50 days by day". Discretisation can be shown graphically as tickmarks, but this is difficult to see.

Where detailed graphical feedback is required the control may increase its own real estate on selection to provide a larger feedback area. The stolen real estate is reinstated when mouse up completes the value change. This is somewhat like a tool tip; in some graphical environments it is not possible.

Dissociation of Mouse from Screen Pointer

Mouse input is traditionally converted to a screen pointer. This screen pointer position is then used for pointing and for scrolling. The association with screen position is essential for pointing, but for scrolling and other input actions of the mouse it is unhelpful.

During value control interaction of this invention the user typically receives three forms of feedback: (1) mouse pointer position on the screen, (2) direct feedback of the value by the control, and (3) application interpretation of the value. The mouse pointer position does not relate to anything useful during the interaction and preferably should not be shown on the screen. At the end of the interaction (mouse up) the mouse pointer should still be situated in its position on the control when mouse down initiated the interaction.

Ideally, the mouse movement should not be given a screen position at all during the interaction. Suppressing display of the screen position still constrains the scope of mouse movement at the 'edges of the screen'. Thus dissociation of mouse pointer from screen is convenient in some graphical environments.

Clutch

The variable sensitivity of this invention reduces the need for large movements of the mouse to make large value changes. Sometimes, such movements are still more intuitive for the user. Also, very large changes in the sensitivity require large mouse movements. These large movements are limited by the size of the mouse mat and (unless the mouse is dissociated from the screen pointer) the range of the screen pointer.

A common interaction technique to create a broad movement is to use stroking. This is most commonly a sequence such as left movement with the mouse on the mat, right movement with the mouse off the mat, left movement with the mouse on the mat, right movement with the mouse off the mat, and so on. Lifting the mouse from the mat acts as a physical 'clutch'. This form of stroking is typically used to get over the limitations of the size of the mouse mat. It does not get over screen pointer limitations. It is also awkward if the mouse button needs to be kept depressed.

Another common example of a clutch uses a sequence of left movements with mouse button down and a right movement with mouse button up. With the button up, the control does not take account of the mouse movement. This technique overcomes limitations of screen pointer range. It is awkward where the control is small, as the control loses focus if the mouse pointer does not return exactly to the control before each mouse down.

The second mouse button, or a special key such as the Control key, can be used as a clutch. As long as the first button remains pressed the control retains focus. While the clutch is pressed as well, the mouse movements are ignored. Stoking becomes a sequence of right movement with left button down, left movement with both buttons down. This overcomes both mouse mat and screen pointer limitations, and does not require the mouse to be lifted with the button still depressed.

Key Strokes and Other Interactions

The invention will usually be complemented by interaction defined by keystrokes. For example, the value may be set by text input of the value. Value and sensitivity may be modified by the cursor keys, and keys such as Page-Up and Home.

It may also be complemented by mouse click areas such as those conventionally used on spin, slider and scroll controls.

EXAMPLES OF USE

Component

This invention may be manifested as a component, for example a Java bean or an ActiveX control. That provides easy use by an application programmer. The major properties are min, max and value. Other properties are used to control refinements such as discretisation and programmer control of default sensitivity, but default to sensible values if not set. For example, the default stroke range makes the value exactly span the range from min to max with a full screen stroke of the mouse.

This component can be used wherever a spin control or slider control is used today. It is good for values with a wide range and high precision. It is also good where screen space is at a premium; a small screen or a large number of value controls to be displayed. Both of these criteria apply to music software.

Application

Alternatively, where the overhead of including a large number of components is too great, an application may decide to undertake all the graphical drawing and interaction itself.

FIGS. 9A–9C show the invention used in an application. This application uses the invention to edit numbers embedded in free text. The application (51) draws a cartoon face (52). The shape of the face is defined by various control values, displayed in a text string (53). For each control value a value (54) and name (55) is displayed. The identified value is named 'topshape' with value 2.4, and effects the shape of the top of the head (56). The cursor (57) has just selected this topshape value in the first frame.

The second frame shows the value being edited. The cursor (57) has been moved right, so the topshape value is increased to 2.6. This has slightly squared the top of the head (56). The initial control is quite fine, with a stroke range of 1.02 (58). The original value before editing is also displayed (59).

In the third frame the cursor (57) has been moved considerably up to permit more far reaching edit. Indeed, it has moved completely outside the application window, but as the mouse button remains pressed focus is not lost. The stroke range (58) is increased to 14.86. The cursor (57) has also been moved left to make a significant decrease in the topshape value (54) to 0.5539. The effect of this is clearly visible in the shape of the top of the head (56).

Spreadsheet

A spreadsheet could implement the technique for each cell. Interaction would be initiated by a special selection, such as a reserved control key or clicking a particular region of the cell.

Where the cell contained a constant value, the cell value would simply be updated as the mouse moved. All cell values and graphs derived from the selected cell would be updated according to the normal spreadsheet recalculation rules where the cell contained a formula, the current value and its derived cells and graphs would be updated. Also, the cells contributing to the selected cell would be updated by backsolving. Owing to various problems with backsolving it may be preferred to prevent direct interaction with formula cells. (NB This spreadsheet use of 'implied' graphical interaction could apply to ANY real-estate efficient interaction technique.)

Text

Freeform text often contains numbers and other values. Special selection of an area of text containing a number can invoke the invention to change the value in place.

This is useful where the text area is connected 'live' to an application that understands and interprets the text. An example is a mathematical equation drawn as a graph (as in Mathematica) or a program used to generate a computer form. Where the text area is being used simply for text entry it is probably easier to enter and edit the values using conventional keystroke techniques. (NB This text use of 'implied' graphical interaction could apply to ANY real-estate efficient interaction technique.)

Scaling and Movement

Graphical editors use many techniques to move and scale selected areas and objects. A typical example is the use of grab handles at the corners and edges of a box or region. Many of the interactions only change a single variable at a time; for example interaction with the centre right grab handle moves the right side to track the cursor, but ignores vertical movement of the cursor. The invention can be used to augment the use of these handles. This is especially useful for fine placement of objects.

Some of these, such as drag, already use the two dimensions of mouse movement for a two dimensional change to the object. These are not candidates for use of the invention. However, when precision is required users often use two separate interactions in any case, one in each dimension.

Such techniques may also be used for other graphical transformations of an object such as rotation, skewing and morphing.

It will be seen that in the preferred embodiments of the invention, a mouse pointer is described. It should be seen, however, that the invention is not limited to this or other related types pointing devices. For example, the arrow keys of the keyboard can also be used as pointers where the "up" and "down" arrows are used to control sensitivity and the "left" and "right" arrows are used to control the value or vice versa.

What is claimed is:

1. A value selector component for a graphical user interface control comprising:
   a reader for reading successive pointer movements when said user interface control is in focus; and
   a control unit responsive to pointer movement in one direction to control a value and responsive to pointer movement in another direction to control a rate of change of the value in response to the movement in the one direction.

2. A value selector component as claimed in claim 1, wherein said pointer comprises a mouse pointer comprising at least one button.

3. A value selector component as claimed in claim 1 wherein said user interface control comprises a window whose size and/or screen position is controlled by said value.

4. A value selector component as claimed in claim 1, wherein said user interface control comprises an entry field or a segment of a text field adapted to display said value.

5. A value selector component as claimed in claim 1, wherein said user interface control comprises a spreadsheet cell adapted to display said value.

6. A value selector component as claimed in claim 1, wherein said user interface control is adapted to acquire pointer focus when a pointer is moved over said control and said pointer is actuated, and said control is adapted to retain said focus even when said pointer moves outside said control until said pointer is deactuated.

7. A value selector component as claimed in claim 1, further comprising a display device to display said rate of change.

8. A value selector component as claimed in claim 2, further comprising a unit for suppressing display of said pointer when said control is in focus.

9. A value selector component as claimed in claim 1, wherein said pointer movements have respective components in said one and said other direction and said component comprises a translation unit responsive to one of said components being relatively greater than the other of said components, for translating said pointer movements into movement in said one or said other direction corresponding to said greater component.

10. A value selector component as claimed in claim 9, wherein said translation unit is responsive to said components being within a predetermined ratio to one another for ignoring said pointer movements.

11. A value selector component as claimed in claim 9, wherein said one direction comprises a horizontal direction and said other direction comprises a vertical direction.

12. A value selector component as claimed in claim 1, further comprising a storage unit for storing a discretisation level for said value and an updating unit, responsive to movement in said one direction, for updating said value in discrete steps determined by said discretisation level.

13. A value selector component as claimed in claim 12, wherein said storage unit is responsive to movements in said other direction to set said discretisation level.

14. A value selector component as claimed in claim 1, further comprising a storage unit for storing a discretisation level for said rate of change and an updating unit, responsive to movement in said other direction exceeding said discretisation level for updating said rate of change.

15. A value selector component as claimed in claim 1 wherein said rate of change is a function of an exponential of movement in said other direction.

16. A value selector component as claimed in claim 1, further comprising a storage unit for storing said value and said rate of change when said control acquires focus and enabling said value and said rate of change to be reset when said user interface control is out of focus.

17. A value selector component as claimed in claim 2, wherein said user interface control remains in focus when a first mouse button is actuated and said value selector component further comprises a unit for ignoring mouse movements when one of a group of a second button and a keyboard control or another control is actuated.

18. A value selector component as claimed in claim 4, wherein said value comprises one of a date, a time, a datetime and a weight.

19. An application including a graphic user interface, said application including a unit for instantiating one or more value selector components, each of said value selector component comprising:
   a reader for reading successive pointer movements when said user interface control is in focus; and
   a control unit responsive to pointer movement in one direction to control a value and responsive to pointer movement in another direction to control a rate of change of the value in response to the movement in the one direction.

20. A computer program product comprising computer program code stored on a computer readable storage medium for, when executed on a computer, controlling a value in a control, the program code comprising a value selector component, said value selector component comprising:
   a reader for reading successive pointer movements when said user interface control is in focus; and
   a control unit responsive to pointer movement in one direction to control a value and responsive to pointer movement in another direction to control a rate of change of the value in response to the movement in the one direction.

21. A method of controlling a value in a graphical user interface control comprising:
   reading successive pointer movements when said user interface control is in focus; and
   responsive to pointer movement in one direction, controlling a value; and
   responsive to pointer movement in another direction, controlling a rate of change of the value in response to the movement in the one direction.

* * * * *